United States Patent Office 3,336,371
Patented Aug. 15, 1967

3,336,371
PROCESS FOR THE PREPARATION OF N,O-DI-METHYLHYDROXYLAMINE N - SULFONIC ACID
Jack A. Snyder, Claymont, Del., assignor to E. I. du Pont de Nemours and Company, Wilmington, Del., a corporation of Delaware
No Drawing. Filed Sept. 24, 1962, Ser. No. 225,861
3 Claims. (Cl. 260—500)

This application is a continuation-in-part of my copending application, Ser. No. 93,848, filed Mar. 7, 1961, now abandoned.

This invention relates to the preparation of N,O-dimethylhydroxylamine and its precursor N,O-dimethylhydroxylamine N-sulfonic acid, sodium salt. The invention is more particularly directed to processes for the methylation of O-methylhydroxylamine N-sulfonic acid, sodium salt to product N,O-dimethylhydroxylamine N-sulfonic acid, sodium salt.

Processes of the invention proceed according to the following:

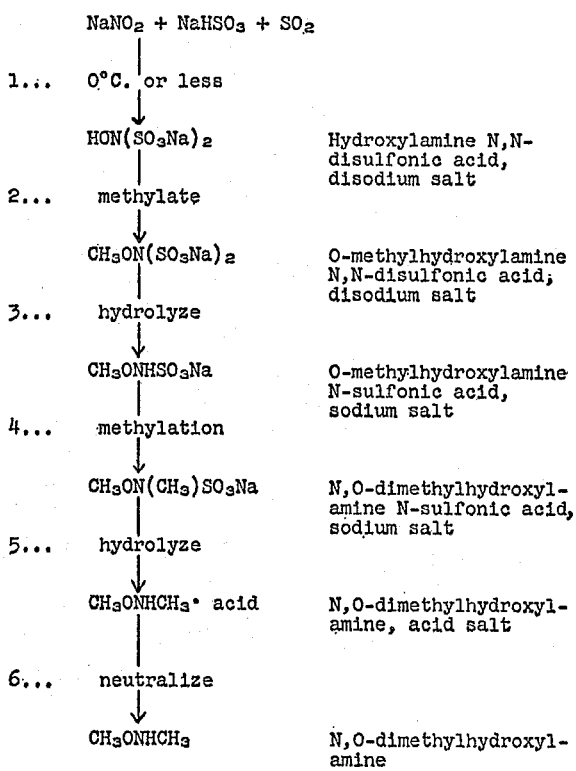

STEP 1.—THE REACTION OF NITRITE, BISULFITE, AND SULFUR DIOXIDE

This step is carried out as in the literature for the Raschig process particularly as improved by subsequent workers. An aqueous solution of sodium bisulfite is added to an aqueous solution of sodium nitrite, the solutions being as concentrated as is convenient for handling.

After this addition has been made, sulfur dioxide is added and according to the present invention it is very important how this is done. First of all local excesses of sulfur dioxide must be avoided by vigorous agitation and by good dispersion of the sulfur dioxide gas. It is furthermore important not to greatly exceed an equimolecular amount of sulfur dioxide. Ordinarily sulfur dioxide is added to a Congo red end point but this utilizes more than an equimolecular amount and does not lead to best results. It is preferred that the sulfur dioxide be added as rapidly as possible considering the size of the operation and the heat disposal equipment available. While the art has shown that the time required for this addition may run up to 8 hours, it is preferred according to this invention that time be considerably less, say not greatly in excess of 2 hours and even preferably should run between about 10 minutes and 30 minutes.

The temperature at which the sulfur dioxide is added should be not greatly above 0° C. and it is preferred that it be below 0°. The temperatures can go as low as desired down to the point at which there is freezing so that the solution is no longer liquid.

It will be understood that instead of using sodium bisulfite or sodium nitrite one can instead use the equivalent alkali or alkaline earth metal salts such as those of calcium or potassium. Throughout the specification when reference is made to a sodium compound it will be understood that the alkali or alkaline earth metal salts can interchangeably be used and various of them can be used. Thus potassium nitrite can be used with sodium bisulfite or vice versa.

STEP 2.—THE FIRST METHYLATION

Ordinarily the methylation would be conducted by adding dimethylsulfate together with sufficient alkali to control the pH, all at a temperature at which methylation proceeds. We have found that good yields are obtained if the caustic is added at a low temperature as in the first step and if the methylation is then begun at low temperature. Higher temperatures can be used without great loss of yields and temperatures can be used up to room temperature or even above.

In processes of the invention the hydroxylamine-N,N-disulfonic acid, disodium salt is treated by the addition of about 1 to 2.0 mols of sodium hydroxide or other alkali, the mol proportion being based upon the amounts of reactants used in the first step. If the process begins with preformed hydroxylamine N,N-disulfonic acid the proportion is based on the amount of this compound. It is preferred to use about 1.5 mols. The addition is begun at a temperature as in the first step, which is preferably less than 0° C. The temperature should be held in this range until a pH of about 8 is reached and the remainder of the caustic can then be added without temperature control, the temperature normally rising to about room temperature, say about 25° C.

After the addition of sodium hydroxide is complete dimethylsulfate in the proportion of 0.8 to 2.0 mols based on the amount of reactants used in Step 1 or alternatively on the amount of hydroxylamine-N,N-disulfonic acid disodium salt if the process begins with this compound. The amount of dimethylsulfate should not exceed the mol proportion of caustic used.

The addition is begun at the temperature of the solution after the caustic addition which will ordinarily be near or below 25° C. The addition can be made all at once or step-wise, but in any event there should be good agitation in order to get good dispersion of the dimethylsulfate.

During the addition of dimethylsulfate the temperature will rise because of the heat of reaction, and, to a lesser extent, because of sensible heat. During the addition it is generally advantageous to cool the reaction vessel in order to prevent the reaction temperature exceeding about 50° C. The mixture is held in this temperature range until caustic consumption ceases. This temperature of methylation from 20 to 50° C. is not critical and is governed by the considerations ordinarily used in determining temperatures of methylation.

STEP 3.—THE FIRST HYDROLYSIS

The mixture obtained in Step 2 is hydrolyzed by the addition of a suitable acid until the mixture is acidic, that it at a pH below 7. Preferably the pH should range from 6 to 1. It is preferred that the pH should be nearer 1. Sulfuric acid, hydrochloric, or another mineral acid can be used. The mixture is then heated at 40° to 80° C., preferably around 50° C., until hydrolysis of one sulfonic group is complete. The progress and completion of the hydrolysis can be followed by the increase in acidity. The product of hydrolysis is O-methylhydroxylamine N-sulfonic acid, sodium salt.

STEP 3a.—ISOLATION OF O-METHYLHYDROXYLAMINE

As an alternative to Step 3, if it is desired to isolate O-methylhydroxylamine, the sodium methyl sulfate formed in Step 2 is removed by adding an alkali such as sodium hydroxide in the proportion of 1 to 1.5 mols, preferably 1.1 mols, based upon the amount of dimethylsulfate used, and heating to boiling until alkali consumption ceases. It is advantageous to remove the methanol formed in this step by distilling during this period. After alkali consumption ceases, the pH is lowered to about 0.5 by addition of mineral acid, and the mixture is heated at reflux temperature until hydrolysis is complete,. The product is isolated as described for O,N-dimethylhydroxylamine under Step 5 below.

STEP 4.—THE SECOND METHYLATION

O-methylhydroxylamine N-sulfonic acid, sodium salt produced as above can be further methylated.

This is done by adding an alkali such as sodium hydroxide to neutralize acid present and then further sodium hydroxide is added in the proportion of 1 to 1.5 mols, preferably 1.1 mols, based upon the amount of dimethylsulfate employed above. The mixture is then heated to boiling. Water and lower boiling components such as methanol and trimethylhydroxylamine are distilled off. Heating and distillation are continued until alkali consumption ceases. This will ordinarily require a couple of hours depending upon the temperature. As much as 20% of the pot contents will be distilled off.

The product of methylation is N,O-dimethylhydroxylamine N-sulfonic acid, sodium salt, contaminated principally with only O-methylhydroxylamine N-sulfonic acid, sodium salt. The amount of contamination can be as low as of the order of 1 or 2% depending upon how closely the process conditions are held.

While the sodium methyl sulfate used for the methylation in Step 4 is derived from the dimethyl sulfate used earlier one can instead start a process with O-methylhydroxylamine N-sulfonic acid, sodium salt produced in any way and can use sodium methyl sulfate as the methylating agent employing the process conditions as herein described.

STEP 5.—THE SECOND HYDROLYSIS

The mixture as obtained is hydrolyzed by lowering the pH to 1 or below and heating at reflux temperatures until hydrolysis is substantially complete. This again can be measured by the acid produced. Reflux temperatures are of course temperatures at or just below the boiling point.

If analyses show that substantial amounts of methanol still remain after the second methylation, some advantage can be gained by distilling further during the second hydrolysis. Again, up to 5 to 10% of the pot contents can be distilled. As will be appreciated by those skilled in the art, distillation at this point will involve some loss of yield due to the relatively high dissociation pressure of the salts of weak amines.

STEP 6.—LIBERATION OF N,O-DIMETHYLHYDROXYLAMINE

The product of the second hydrolysis (Step 5) is an aqueous solution saturated with sodium bisulfate, and, to the extent that a mineral acid other than sulfuric is used for acidification, may contain other anions. In the strongly acidic hydrolysis product, the N,O-dimethylhydroxylamine is, of course, present as an ammonium-type sulfate salt. Although this salt has an appreciable dissociation pressure, quantitative recovery of the amine requires that the acids be neutralized by a non-volatile base. The amine thus liberated can best be recovered from the dilute solution by distillation.

To separate the product the best results are obtained by adding sufficient alkali to raise the pH and to maintain the pH during distillation between about 3 and 9. The product can then be distilled. It should be distilled promptly. A pH of between about 5 to 8 ought to be maintained for preferred operation. It is to be noted that one is tempted to add a considerable excess of alkali at this point but this results in a loss of yield to the extent that any residual sodium methyl sulfate is present. However, as pointed out above in Step 4 it is desirable to effect complete removal of sodium methylsulfate in which event an excess of alkali will not impair yields.

The compound N,O-dimethylhydroxylamine produced can be converted to a desired urea by reaction with an appropriate isocyanate. Thus if a 3,4-dichlorophenylisocyanate is used one obtains 1-(3,4-dichlorophenyl)-3-methyl-3-methoxyurea. Other methoxyureas of U.S. Patent 2,960,534 isued Nov. 15, 1960 to Otto Scherer and Paul Heller, can similarly be prepared using the appropriate isocyanate.

In order that the invention may be better understood reference should be had to the following illustrative examples.

Example 1

A. PREPARATION OF HYDROXYLAMINE DISULFONIC ACID, DISODIUM SALT

Hydroxylamine disulfonic acid, disodium salt was prepared by a modification of the well-known Raschig procedure.

To a $-5°$ C. solution of 568 g. of 97% $NaNO_2$ (8 mol.) in 750 g. of water was added slowly over a period of 1.5 hours a cold (5° C.) solution of 880 g. of 95% $NaHSO_3$ (8 mol.) in 2400 g. of water. The mixture was stirred efficiently and was maintained at about $-5°$ C. by an external $CaCl_2$-ice bath. Sulfur dioxide (520 g.; 8.12 mol.) was introduced below the surface at a rate of about 3.5–4 g./min. maintaining the temperature throughout the period at $\leq -4°$ C.

As described earlier in the specification it is preferred to use stoichiometric quantities so that it is somewhat preferable to use 512 g. of sulfur dioxide (8 mols.).

B. PREPARATION OF O,N-DIMETHYLHYDROXYLAMINE

After a 15 minute hold period, 642 g. (1 mol., theoretical basis) of the hydroxylamine-disulfonate solution was transferred to another vessel where the temperature was maintained at $\leq -3°$ C. while two moles of NaOH as 50% aqueous solution was introduced, followed by 202 g. (1.6 mols) of dimethylsulfate. The solution was allowed to warm to about 30° C. and was held at that temperature for about one hour to complete methylation to O-methylhydroxylamine disulfonic acid, disodium salt. At this point an aliquot of the solution was subjected to acid hydrolysis and analyzed by gas chromatography to give a calculated yield of 65% of methoxyamine or O-methylhydroxylamine, $CH_3ONH_2$.

The solution of O-methylhydroxylamine disulfonic acid, disodium salt was acidified to pH 1.0 with 1:1 $H_2SO_4/H_2O$ and was held at 50° C. to effect hydrolysis to O-methylhydroxylamine monosulfonic acid. The acidic solution was neutralized with 50% NaOH to pH 7.0 and 1.6 moles as 50% NaOH was added to produce a thick slurry. The temperature was raised to reflux and maintained for 3.5 hours to effect methylation of the nitrogen of the O-methylhydroxylamine monosulfonic acid, sodium salt.

The alkaline solution was cooled and neutralized to pH 0.7 with 1:1 $H_2SO_4/H_2O$ and the mixture was again heated under reflux for a period of four hours to effect hydrolysis of the sulfonic acid group to N,O-dimethylhydroxylamine, sulfate salt.

Free amine was obtained 67% yield (based upon the $NaNO_2$ used in the first step) by making the solution just basic (pH 8.0) and distilling. By distilling overhead 10% by weight of the pot contents a 43% solution of N,O-dimethylhydroxylamine in aqueous methanol was isolated. Nitrite reaction confirmed the 67% yield calculated from gas chromatography data. The methylation yield of N,O-dimethylamine based upon utilization of both methyls of dimethylsulfate was 42%.

To a portion of the hydroxylamine disulfonic acid, disodium salt preparation (from A above) equivalent to 1.0 mol of $NaNO_2$ (642 g. solution) was added an equivalent quantity (1.0 mol; 80.0 g.) of 50% aqueous NaOH. The temperature was allowed to rise to 40° C. and was controlled there while 0.8 mol of dimethylsulfate was added rapidly. After a further period of 0.5 hour at 40° C. the solution was neutralized and then acidified to pH 1.0 with 1:1 aqueous $H_2SO_4$.

An aliquot of the solution removed at this point and hydrolyzed in acid solution at the boiling point produced O-methylhydroxylamine in 57% yield. The temperature was maintained at 50° C. for 4 hours to effect hydrolysis of O-methylhydroxylamine disulfonic acid to O-methylhydroxylamine monosulfonic acid. Following the hydrolysis period the solution was neutralized with 50% NaOH to pH 7.0 (about 83 g.) and then a further quantity of 80 g. (1.0 mol.) of caustic was added and the solution was heated under reflux for 2.5 hours to effect methylation to N,O-dimethylhydroxylamine monosulfonic acid, sodium salt. The reaction mixture was acidified to pH 0.7 with 1:1 $H_2SO_4$ (83.5 g.) and was heated for 4 hours at the reflux temperature. Analysis of the hydrolysis mixture by gas chromatography demonstrated that a 30% yield of N,O-dimethylhydroxylamine and 5.6% yield of O-methylhydroxylamine were obtained based upon the starting $NaNO_2$. Total methylation yield of these two products based upon utilization of both methyls of dimethylsulfate was 41%.

*Example 2*

A solution of 35.5 parts of 97% sodium nitrite in 200 parts of water was stirred and cooled to −2°, and a solution of 55 parts of 95% sodium bisulfite in 200 parts of water was added, keeping the temperature below −2°. Then, 32 parts of sulfur dioxide was passed in a −2° or below, and finally, a solution of 33 parts of sodium hydroxide in 100 parts of water was added, keeping the temperature at −2° or below. Then 94.5 parts of dimethylsulfate was added and the stirring solution was warmed to 30° and held at 30° with occasional cooling. After the reaction subsided (about 10 minutes), the mixture was stirred 1 hour at room temperature. Then, 60 parts of 50% sodium hydroxide was added, and the mixture was refluxed for two hours, while distilling out methanol. It was then made acidic to pH 0.5 with concentrated sulfuric acid and refluxed 4 hours, then neutralized to pH 6 with 50% sodium hydroxide and distilled, giving a 75% yield of O-methylhydroxylamine as a fairly concentrated aqueous solution. This solution could be fractionated to obtain the pure amine.

*Example 3*

A. PREPARATION OF HYDROXYLAMINE DISULFONIC ACID, DISODIUM SALT

A procedure was followed as in Example 1 except that the sulfur dioxide addition was carried out at a rate of about 17 grams a minute which required about 30 minutes.

B. PREPARATION OF N,O-DIMETHYLHYDROXYLAMINE

After a 15 minute hold period, 642 grams (1 mol theoretical basis) of the hydroxylamine disulfonate solution was transferred to another vessel where the temperature was initially at about −3° C. Upon addition of 2 mols of NaOH as 50% aqueous solution the temperature rose to 25° C. 202 grams (1.6 mols) of dimethylsulfate was then added while cooling the vessel to control the temperature at 40 to 50° C. The solution was held in that temperature range for about 1 hour to complete methylation to O-methylhydroxylamine disulfonic acid, disodium salt.

The solution of O-methylhydroxylamine disulfonic acid disodium salt was acidified to a pH 1.0 with concentrated sulfuric acid (96% $H_2SO_4$) and was held at 50° C. to effect hydrolysis to O-methylhydroxylamine monosulfonic acid. The acidic solution was neutralized with NaOH to pH 7.0, and 1.6 moles as 50% NaOH was added to produce a thick slurry. The slurry was heated to the boiling point and distillation was begun. This distillation was continued for a period of 3.5 hours during which time 20% of the volume of the pot was collected as distillate. During the distillation, methanol and trimethylhydroxylamine passed off overhead and the nitrogen of the O-methylhydroxylamine monosulfonic acid, sodium salt was methylated. From time to time during the distillation, samples were removed from the pot and titrated with acid and this was continued until analysis showed that caustic consumption had ceased.

The alkaline solution was cooled and acidified to pH 1.5 with a concentrated sulfuric acid and the mixture was again heated under reflux for a period of four hours to effect hydrolysis of the sulfonic group. The product of this step was the sulfate salt of N,O-dimethylhydroxylamine.

Free amine was obtained in 62% yield (based upon the $NaNO_2$ used in the first step) by making the solution basic (pH 8.0) and distilling. Single plate distillation yielded 190 grams of aqueous solution containing 20% N,O-dimethylhydroxylamine.

The 20% solution of N,O-dimethylhydroxylamine was then purified by rectification to obtain anhydrous N,O-dimethylhydroxylamine. The analysis of this product is as follows:

| Products: | Amounts percent by weight |
|---|---|
| $CH_3NH_2$ | 0.10 |
| $(CH_3)_2NH$ | 0.06 |
| $(CH_3)_3N$ | 0.14 |
| $CH_3ONH_2$ | 1.35 |
| $CH_3ON(CH_3)_2$ | 0.15 |
| $CH_3OH$ | 0.20 |
| $H_2O$ | 0.02 |
| $CH_3ONHCH_3$ | 97.98 |
| | 100.00 |

The claims are:

1. A process for preparing N,O-dimethylhydroxylamine N-sulfonic acid, sodium salt, comprising boiling an aqueous solution comprising sodium methylsulfate, O-methylhydroxylamine N-sulfonic acid, sodium salt, a quantity of sodium hydroxide sufficient to neutralize said solution and an additional quantity of sodium hydroxide equal to from 1 to 1.5 moles per mole of sodium methylsulfate until caustic consumption ceases.

2. A process for preparing N,O-dimethylhydroxylamine N-sulfonic acid, sodium salt, comprising adding to an aqueous solution comprising sodium methylsulfate and O-methylhydroxylamine N-sulfonic acid, sodium salt, a quantity of sodium hydroxide sufficient to neutralize said solution, adding a further quantity of sodium hydroxide equal to from 1 to 1.5 moles per mole of sodium methylsulfate and boiling the resulting reaction mixture until caustic consumption ceases.

3. A process for preparing N,O-dimethylhydroxylamine N-sulfonic acid, sodium salt, comprising adding to an aqueous solution comprising sodium methylsulfate and O-methylhydroxylamine N-sulfonic acid, sodium salt, a quantity of sodium hydroxide sufficient to neutralize said solution, adding a further quantity of sodium hydroxide equal to from 1 to 1.5 moles per mole of sodium methylsulfate and subjecting the resulting reaction mixture to distillation until caustic consumption ceases, the conditions of said distillation being such that up to 20% by volume of said reaction mixture is distilled off.

References Cited

UNITED STATES PATENTS 3,209,031   9/1965   Scherer et al. _____ 260—500

FOREIGN PATENTS 1,116,232   11/1961   Germany.

LEON ZITVER, *Primary Examiner.*